July 1, 1930.  O. A. BERIAU  1,769,410

REFLECTING LENS

Filed March 17, 1928

INVENTOR
OSCAR.A.BERIAU
BY Featherstonhaugh & Co
ATTORNEYS

Patented July 1, 1930

1,769,410

UNITED STATES PATENT OFFICE

OSCAR A. BERIAU, OF QUEBEC, QUEBEC, CANADA

REFLECTING LENS

Application filed March 17, 1928, Serial No. 262,573, and in Canada October 25, 1927.

This invention relates to light reflecting devices and particularly to reflectors which are commonly used in the construction of road signs and the like, which are rendered visible by the reflection of light from an extraneous source such as the headlights of an automobile. The main object of the invention is to provide a unitary reflecting lens of simple and economical construction which will be readily applied to a signboard without the use of a separate reflecting medium or holder.

Another object is to provide a reflecting lens which when mounted on a sign will be hardly visible in ordinary daylight, but which will commence to glow when a concentrated beam of light is directed towards the lens, such as light from the headlights of an automobile.

According to my invention the reflecting device comprises a cylindrical by-convex lens, one of the convex surfaces of which is covered or coated with a light reflecting medium, such as silver or mercury, to obtain reflection. A protective coating of paint or the like may be applied to the silvered or mercury surface. If a colored reflection is required, the lens may be wholly or partially colored, either within the glass or on one of its surfaces. The lens may be fitted to road signs and be held in place by means of a cementitious compound.

In the drawings which illustrate my invention:

Figure 1:
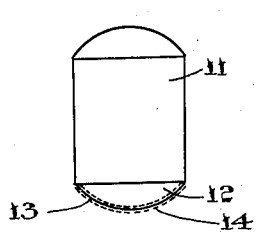
Figure 1 is a side elevation of my preferred form of reflecting lens.
Figure 2:
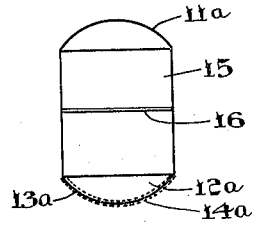
Figure 2 is a side elevation of one modification which may be made to tne lens shown in Figure 1.
Figure 3:
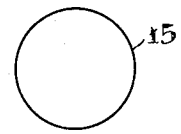
Figure 3 is a plan view of the reflecting lens.
Figure 4:
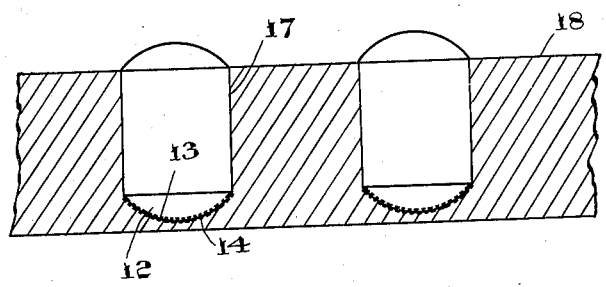
Figure 4 is a part sectional elevation of a sign board showing a pair of my preferred form of lenses mounted thereon.
Figure 5:
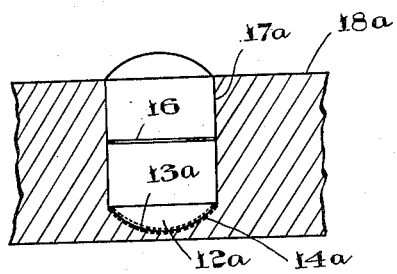
Figure 5 is a part sectional elevation of a signboard with the modified type of lens shown in Figure 2 mounted thereon.

Referring more particularly to the drawings, 11 designates a cylindrical bi-convex piece of glass forming the lens, one convex surface 12 of which may be covered with a coating of mercury 13, silver or the like reflecting means. To protect the silver coating, a coating 14 of paint may be applied to the outer surface of the silver coating. The glass may be of any desired color. In the modified type shown in Figure 2, two cylindrical plano-convex pieces of glass 15 are u ed joined together at their plane surfaces by means of a transparent cement coating 16, the whole forming a cylindrical bi-convex lens 11$^a$ similar to that shown in Figure 1. The cement or the glass may be colored to give any desired effect. The convex surface 12$^a$ may be covered with a coating 13$^a$ of silver or mercury and this may have a protective coating 14$^a$ of paint. The lenses may be placed in recesses 17 or 17$^a$ formed in the boards 18 or 18$^a$. The lenses are self-contained and may be mounted on a signboard without employing light reflecting holders. The silvered coating is very easily applied and reduces the cost of lenses of this type in which special separate reflectors are used for holding the lenses in position. The reflecting lenses may be held in position on the signboard by means of glue, cement, or the like, and the coatings of paint and reflecting means may be protected by the back of the signboard.

The lenses are easily and readily applied to the signboard and are hardly visible in ordinary daylight, but will glow when concentrated light is directed towards the lenses.

Having thus described my invention, what I claim is:—

As a new article of manufacture, a cylindrical bi-convex lens comprising two cylindrical plano-convex pieces of glass joined together at their plane faces by a colored transparent cementitious material to form a cylindrical bi-convex lens, one of the convex surfaces being coated with a light reflecting medium, said light reflecting medium being covered with a coating of protective material.

In witness whereof, I have hereunto set my hand.

OSCAR A. BERIAU.